C. W. DAKE.
OILING DEVICE.
APPLICATION FILED AUG. 9, 1920.
1,402,055.
Patented Jan. 3, 1922.
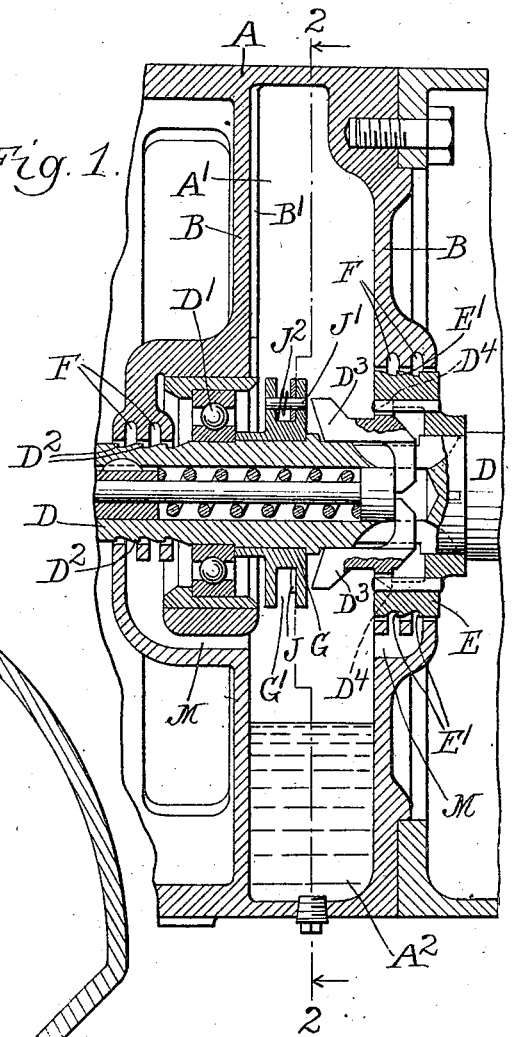
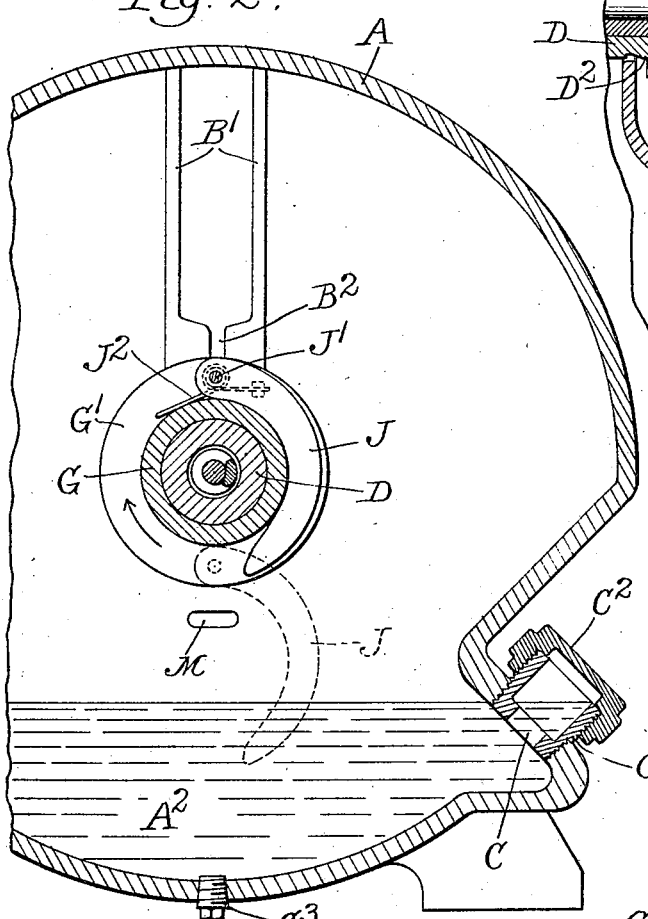
Witness.
Edward T. Wray.
Inventor.
Charles W. Dake.
by Parker & Carter
Attorneys

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

OILING DEVICE.

1,402,055.

Specification of Letters Patent.

Patented Jan. 3, 1922.

Application filed August 9, 1920. Serial No. 402,250.

*To all whom it may concern:*

Be it known that I, CHARLES W. DAKE, a citizen of the United States, residing at Chicago, in the county of Cook and State of Illinois, have invented a certain new and useful Improvement in Oiling Devices, of which the following is a specification.

My invention relates to an oiling device particularly adapted for oiling rotating parts, and in the illustration here shown particularly adapted to oil certain parts of a turbine engine.

The objects of my invention will appear from the following description of the drawings and statement of the invention.

Fig. 1 is a cross section through a portion of a turbine engine, the parts here shown being the shaft, the governor weights, the oil well and the oiling device.

Fig. 2, is a transverse section on the line 2—2 of Fig. 1.

Like parts are indicated by the same letter in all the figures.

A is a casing shaped so as to form the oiling space A' and the oil well A². The sides B, B, are apertured to admit the shaft of the turbine and the associated parts. There is an oil receiving opening C associated with a screw threaded nipple C' and a cap C². C³ is a plug in the bottom of the oil well which permits the oil to be drawn off. D is the turbine shaft mounted in the bearing D', and provided with the shoulders D² D² and carrying the governor weights D³ D³ the same being mounted in slots in the hollow portion of the shaft D and fulcrumed at D⁴ D⁴ on the ring E which rotates with the shaft and is provided with the grooves E'. This ring with its grooves cooperates with the grooves F F in the hub like enlargement F' of the side B of the casing, to prevent the outward passage of oil along the shaft or the parts associated with it. M M are channels with which the grooves F F communicate and through which the oil from the grooves will flow back to the main oil well A².

Mounted on the hollow portion of the shaft is a ring G having a groove G' in which lies the oil distributor J. This oil distributor is pivotally mounted on the pin J', and is associated with the spring J² which tends to keep the distributor in the position shown in full lines in Fig. 2, that is in inoperative position when the parts are at rest. On the inside of the casing B are vertical ribs B' B' which approach each other at the point B² so as to direct the oil which may be flowing down the inner side of such casing toward the bearing.

The oil level in the well can of course be maintained at any desired point.

The oil distributor, is, when the shaft is at rest, out of contact with the oil and when the shaft is rotating it extends into the oil as indicated in dotted lines. This oil distributor may of course be of any desired size, form, shape and proportions. I have illustrated it in the shape of a semi-circle or half ring, and as I have illustrated it, it consists of a thin, flat piece of metal which when passed through the body of the oil picks up a quantity of oil and carries it up into and distributes it through the oiling space and on the inside of the casing. If the rotating parts, as in the case of a turbine engine, rotate rapidly such an oil distributor will keep the inside of the casing saturated or filled with oil charged atmosphere which causes the lubrication of all the parts. If the parts are, like the governor weights, exposed within the chamber, they will be constantly sprinkled with oil and their bearings or wearing parts will be abundantly oiled. If they are at one side of the chamber as in the case of a shaft bearing, the oil will travel down the sides of the casing and then into the bearing and along the shaft until arrested. The bearing will be well lubricated. Channels M M in the walls of the casing will direct the oil after it has performed its oiling function down into the oil well.

The sediment which the oil may contain or take up in the performance of its oiling function will drop to the bottom of the oil well into a zone of relatively quiet oil for the oil distributor does not project into the bottom of the oil well. When this oil is too heavily charged with sedimentary matter it can be drawn off.

This oil distributor can be mounted and held in position in any desired manner. The ring and groove arrangement has one advantage in this, that it protects the oil distributor from injury when the shaft is moved longitudinally through the apertures in the casing. This arrangement of course is not essential. The oil distributor is also controlled by a retracting spring which is light enough to permit the distriblutor to move outwardly when the parts are in rotation. This device could easily be dispensed with and some other substituted. I have shown but a single oil distributor element, but of course numbers of them could be used; and any necessary change could be made in the size and shape of the oil space casing.

As previously stated my oiling device can be used anywhere and for any purpose where there are rotating parts within a suitable enclosed casing. The oil well is so arranged in the casing that there are no parts which are packed against the escape of oil from the well and there is no escape for the oil beneath the level of the oil in the well.

When the parts are at rest they will be arranged as indicated in full lines in Figs. 1 and 2, and the shaft can be moved longitudinally carrying with it all its associated parts including the oil distributor, and in this case its groove and spring and the governor weights.

When the machine is set in operation the oil distributor will be extended into the position shown in dotted lines in Fig. 2, whereupon at each revolution, and of course if desired there can be a number of oil distributors pivoted at different points, its end will project into the oil in the well and take up a quantity of such oil and carry it around and distribute it in the oil laden atmosphere of the casing or oil space. This will result in oiling everything within the casing including in this instance the governor weights, and the oil will be thrown over the inner surface of the casing, whereupon it will run down and find its way out into the chamber in which portions of the governor weights are extended and the chamber in which the turbine shaft bearing is located.

The oil distributor could be mounted directly on the rotating part or in the groove formed in that part, or between apertures in the part or in the groove ring smoothly mounted on the shaft as here shown.

I claim:

1. An oiling device comprising a casing containing an oil chamber, a rotatable part therein, and an oil distributor mounted on the rotating part and adapted when the rotating part is at rest to be retracted, and when the latter is in motion to be extended radially.

2. An oiling device comprising a casing containing an oil chamber, a rotatable part therein, and a thin knifelike oil distributor mounted on the rotating part and adapted when the rotating part is at rest to be retracted, and when the latter is in motion to be extended radially.

3. An oiling device comprising a casing containing an oil chamber, a rotatable part therein, and an oil distributor mounted on the rotating part and adapted when the rotating part is at rest to be retracted and when the latter is in motion to be extended radially, said distributor pivotally mounted on the rotating part.

4. An oiling device comprising a casing containing an oil chamber, a rotatable part therein, an oil distributor mounted on the rotating part and adapted when the rotating part is at rest to be retracted, and when the latter is in motion to be extended radially, said distributor pivotally mounted on the rotating part, and a spring which tends to cause it to be retracted.

5. An oiling device comprising a casing containing an oil chamber, a rotatable part therein, and an oil distributor mounted on the rotating part and adapted when the rotating part is at rest to be retracted and when the latter is in motion to be extended radially, said distributor mounted in a groove within which it lies when the rotating part is at rest.

6. An oiling device comprising a casing containing an oil chamber, a rotatable part therein, an oil distributor mounted on the rotating part and adapted when the rotating part is at rest to be retracted, and when the latter is in motion to be extended radially, and a grooved portion on the rotating part within whose groove the oil distributor is mounted.

7. An oiling device comprising a casing containing an oil chamber, a rotatable part therein, an oil distributor mounted on the rotating part and adapted when the rotating part is at rest to be retracted and when the latter is in motion to be extended radially, and a grooved portion on the rotating part within whose groove the oil distributor is mounted, said distributor pivoted in the groove.

8. An oiling device comprising a casing containing an oil chamber, a rotatable part therein, an oil distributor mounted on the rotating part and adapted when the rotating part is at rest to be retracted, and when the latter is in motion to be extended radially, a grooved portion on the rotating part within whose groove the oil distributor is mounted, said distributor pivoted in the groove, and a spring normally to keep it within the groove when the rotating part is at rest.

9. An oiling device comprising a casing containing an oil chamber, a rotatable part therein, and an oil distributor mounted on the rotating part and adapted when the rotating part is at rest to be retracted, and when the latter is in motion to be extended radially, said casing having an oil well in the bottom and an oiling space above in which the parts to be oiled are mounted.

10. An oiling device comprising a casing containing an oil chamber with an oil well at the bottom, a rotatable part therein above the surface of the oil in the well, and an oil distributor mounted on the rotating part and adapted when the rotating part is at rest to be out of engagement with the oil and when it is in motion to engage the oil.

11. An oiling device comprising a casing containing an oil chamber with an oil well at the bottom, a rotatable part therein above the surface of the oil in the well, and an oil distributor mounted pivotally to permit it to swing outward when the rotating part is in motion, and means to normally cause it to be retracted when the latter is at rest.

12. In an oiling device an oil distributor consisting of a thin, flat pivoted piece in combination with a rotating part to which it is pivotally attached.

13. In an oiling device an oil distributor consisting of a thin, flat arc shaped piece, in combination with a rotating part to which it is pivotally attached.

14. In an oiling device an oil distributor consisting of a thin, flat arc shaped piece, in combination with a rotating part to which it is pivotally attached, and a spring which tends to cause it to be retracted when the latter is at rest.

15. An oiling device comprising a casing containing an oil well in the bottom thereof, and a rotating part above the oil in the well, and an extensible thin, flat oil distributor mounted on the rotating part, and a part to be lubricated mounted on one wall of the casing.

16. An oiling device comprising a casing containing an oil well in the bottom thereof, a rotating part above the oil chamber, an extensible oil distributor mounted on the rotating part, and a part to be lubricated mounted on one wall of the casing, the inner wall of the casing above such part provided with downwardly directed ribs which direct the flow of oil in the casing toward the part.

17. An oiling device comprising a casing containing an oil well in the bottom thereof, a rotating part above the oil chamber, an extensible oil distributor mounted on the rotating part, and a part to be lubricated mounted on one wall of the casing, said casing containing a channel leading from the part to the oil well.

18. An oiling device comprising a casing containing an oil well in the bottom thereof, a rotating part above the oil chamber, an extensible oil distributor mounted on the rotating part, and a part to be lubricated mounted on one wall of the casing, the inner wall of the casing above such part provided with downwardly directed ribs which direct the flow of oil toward the part, said casing containing a channel leading from the part to the oil well.

19. In an oiling device the combination of a casing having an oil chamber with an oil well at the bottom, and an oiling space above, with a rotating part which passes through the chamber, means in the wall of the chamber for preventing the oil from passing longitudinally along the rotating part outside the casing, and an extensible oil distributor mounted on the rotating part and adapted when the latter is in motion to engage the oil.

20. In an oiling device the combination of a casing having an oil chamber with an oil well at the bottom, and an oiling space above, with a rotating part which passes through the chamber, means in the wall of the chamber for preventing the oil from passing longitudinally along the rotating part outside the casing, and an extensible oil distributor mounted on the rotating part and adapted when the latter is in motion to engage the oil, said casing having a filling opening which limits the height of oil in the oil well.

21. An oiling device comprising a casing containing an oil chamber with an oil well at the bottom, a rotating part therein above the surface of the oil in the well, and an oil distributor mounted on the rotating part and adapted to be extended when the part rotates, and means to cause it to be retracted when the rotating part is at rest.

22. In an oiling device an oil distributor consisting of a thin, flat and arc shaped piece, in combination with a rotating part to which it is attached so as to be radially movable.

23. An oiling device comprising a casing containing an oil well in the bottom thereof, a rotating part above the oil in the well, and a thin, flat oil distributor mounted on the rotating part and adapted to extend when the rotating part is in motion.

24. An oiling device comprising a casing containing an oil chamber with an oil well at the bottom, a rotatable part therein above the surface of the oil in the well, and an oil distributor mounted on the rotating part adapted when the latter is at rest to be out of contact with the oil and when the latter is in motion to engage the oil.

25. An oiling device comprising a casing containing an oil well in the bottom thereof, and a rotating part above the oil in the well, and a centrifugal extensible oil distributor mounted on the rotating part.

26. An oiling device comprising a casing containing an oil well in the bottom thereof, and a rotating part above the oil in the well, and an oil distributor mounted on the rotating part and adapted centrifugally to extend when the rotating part is in motion.

Signed at Chicago, county of Cook, and State of Illinois, this 29th day of July, 1920.

CHARLES W. DAKE.